Sept. 4, 1962 F. L. MOSELEY ET AL 3,052,884
GRAPHICAL RECORDERS
Filed Dec. 10, 1956 4 Sheets-Sheet 1

INVENTORS
FRANCIS L. MOSELEY
GLENN R. WHITELEY
BY
Robert H. Moseley
ATTORNEY

Sept. 4, 1962     F. L. MOSELEY ET AL     3,052,884
GRAPHICAL RECORDERS

Filed Dec. 10, 1956     4 Sheets-Sheet 2

INVENTORS
FRANCIS L. MOSELEY
GLENN R. WHITELEY
BY Robert H. Mann
ATTORNEY

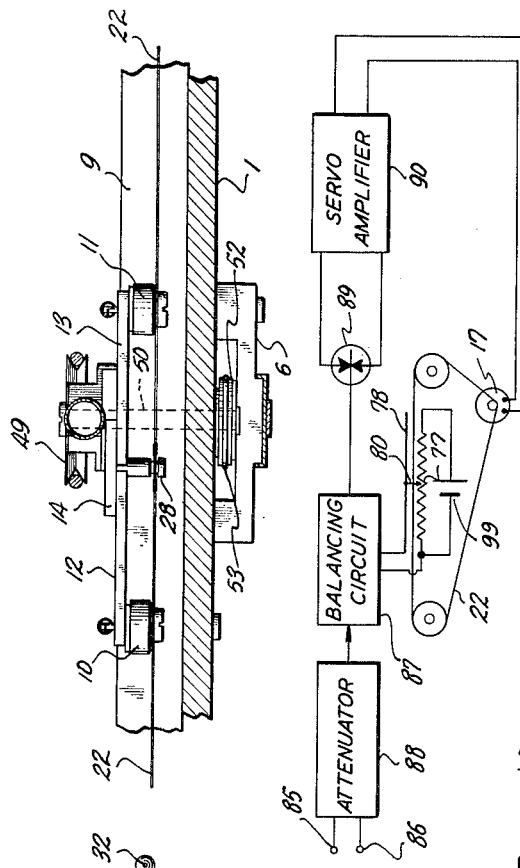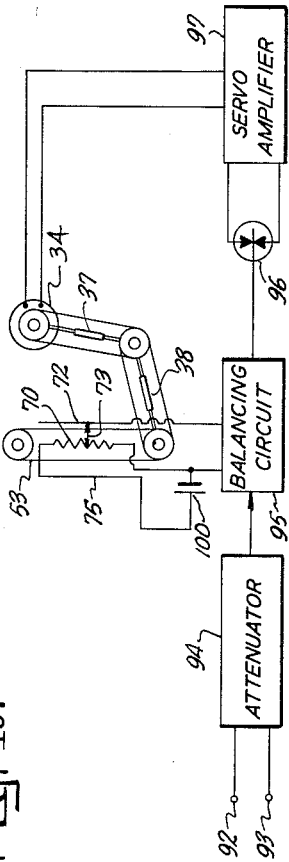

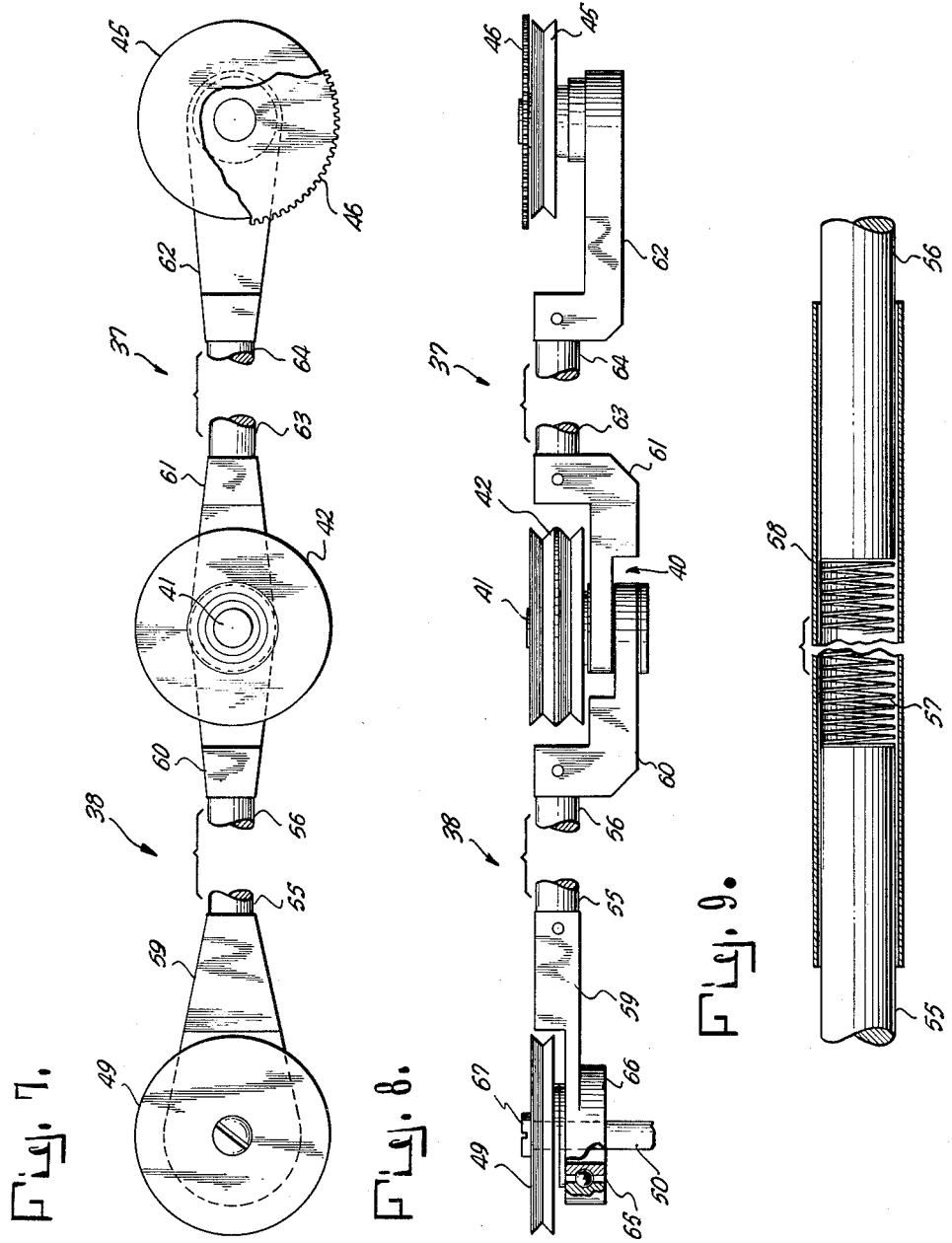
Fig. 7. Fig. 8. Fig. 9.
INVENTORS
FRANCIS L. MOSELEY
GLENN R. WHITELEY
BY 
ATTORNEY United States Patent Office 3,052,884
Patented Sept. 4, 1962

3,052,884
GRAPHICAL RECORDERS
Francis L. Moseley and Glenn R. Whiteley, Pasadena, Calif., assignors to F. L. Moseley Co., a corporation of California
Filed Dec. 10, 1956, Ser. No. 627,191
13 Claims. (Cl. 346—29)

This invention relates in general to graphical recorders, and more particularly, this invention relates to a new and improved system for transporting a graphical recorder marking element relative to a recording medium and for generating electrical signals representing the position of the marking element.

In graphical recorders of the type in which a marking element, such as a pen, is transported relative to a recording medium, servo systems are frequently employed to position the marking element. In a graphical recorder servo system an input signal representing the variable quantity may be applied to a balancing circuit and a balancing voltage may be opposed to the input signal. The balancing voltage represents the position of the marking element, and in a state of balance the input signal and the balancing voltage are substantially equal and opposite. Upon a change in the input signal, an error signal is generated corresponding to the difference between the balancing signal and the input signal, and the marking element is re-positioned in accordance with the error signal until the marking element is located in a position corresponding to the value of the input signal and a state of balance is achieved in the input circuit.

In recorders which are adapted to reproduce graphically the relationship between two variables, the marking element may be moved in one direction under the control of a servo system which follows a first input signal representing one variable quantity, and the marking element may be moved in a direction transverse of the first direction under the control of a servo system which follows a second input signal representing the other variable quantity.

Since the marking element in a graphical recorder of the type described above is independently positionable in two directions, a drive system must be provided for linking the servo system drive motors to the marking element. In one arrangement, the marking element is movable along the length of a carriage in one direction and the carriage is movable longitudinally in a direction transverse of the direction of movement of the marking element along the carriage. The carriage itself may be positioned relatively easily through a system of cables or belts from a stationary drive motor. However, positioning the marking element along the length of the carriage independently of the position of the carriage has heretofore been difficult.

In one system, the drive motor for positioning the pen along the carriage is mounted on the carriage. Although such an arrangement simplifies the mechanical linkage it requires that space be set aside to allow for the movement of the motor throughout the travel of the carriage. In addition, the electrical connections between the stationary servo amplifier and the motor may be subject to wear as the carriage and motor are transported back and forth.

In another known system, both drive motors are stationary and the marking element is driven relative to the carriage through a splined shaft which is linked to a sheave on the carriage. The sheave slides along the length of the splined shaft and the marking element is driven from the motor through the splined shaft and sheave. In practice it has been found that the splined shaft and sheave arrangement requires a high order of manufacturing precision to provide a satisfactory linkage.

Accordingly, it is an object of the present invention to provide a simple and effective system for transporting a graphical recorder marking element in two mutually transverse directions which avoids the difficulties mentioned above.

It is an additional object of the present invention to provide a graphical recorder drive system in which a marking element may be transported in two mutually transverse directions from two separate servo systems having stationary drive motors.

It is still another object of the present invention to provide a new and improved mechanical linkage by means of which a marking element of a graphical recorder may be transported on a movable carriage from a stationary drive motor.

It is a further object of the present invention to provide a new and improved graphical recorder in which balancing voltages are generated with a high degree of accuracy in accordance with the position of a marking element.

A better understanding of the invention may be had from a reading of the following detailed description and an inspection of the drawings, in which:

FIG. 5 is a sectional view of the recorder taken along line 5—5 of FIG. 3;

FIG. 6 is a bottom view of a portion of the carriage and associated pen mechanism corresponding to a portion of the graphical recorder of FIG. 1;

FIG. 7 is a partial plan view of a jointed drive arm and drive pulleys forming a part of the recorder of FIG. 1;

FIG. 8 is an elevational view of the drive arm and pulleys of FIG. 7;

FIG. 9 is a partial sectional view of a jointed drive arm of the recorder of FIG. 1; and FIG. 10 is a combined block and schematic circuit diagram of a graphical recorder adapted to position a marking element in accordance with the relationship between two electrical input signals.

Figure 4:
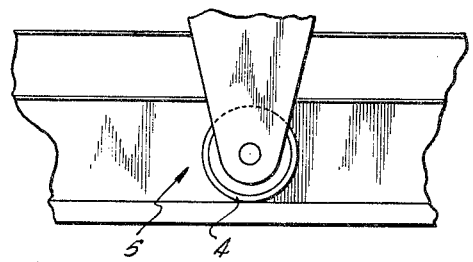
FIG. 4 is a view taken along line 4—4 illustrating a portion of the graphical recorder of FIG. 1.

Turning to the drawings in detail, a graphical recorder is shown which includes a bed 1 (FIG. 1) for receiving a recording medium such as a sheet of graph paper. A clamp 2 is adapted to hold a graphical record sheet in position on the bed 1. A carriage 3 is transportable longitudinally of the bed 1. At one end of the carriage 3 (FIG. 4) a wheel 4 is journalled to the carriage 3 and rolls along a track 5 which is attached to the edge of the bed 1. The other end of the carriage 3 (FIGS. 1, 2, 3 and 5) is attached to a slider block 6 which supports on a pair of shafts the wheels 7 and 8. The wheels 7 and 8 engage a V-shaped groove in a member 9 which is attached to the edge of the bed 1. A pair of rollers 10 and 11 (FIGS. 3 and 5) are supported on the arms 12 and 13 which are pivoted to a bracket 14 attached to the slider block 6. The springs 15 and 16 hold the rollers 10 and 11 in engagement with the opposite side of the member 9 from the V-shaped groove which receives the wheels 7 and 8.

Figure 1:
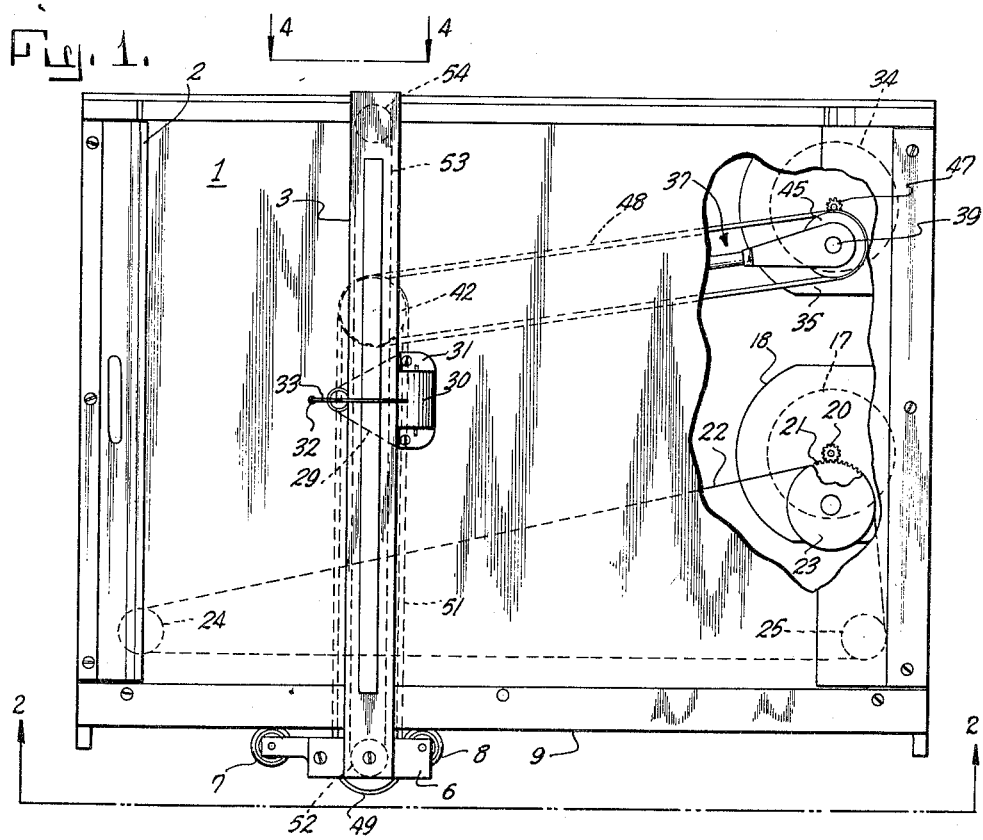
FIG. 1 is a top view of a graphical recorder including an illustrative embodiment of the present invention.
Figure 3:
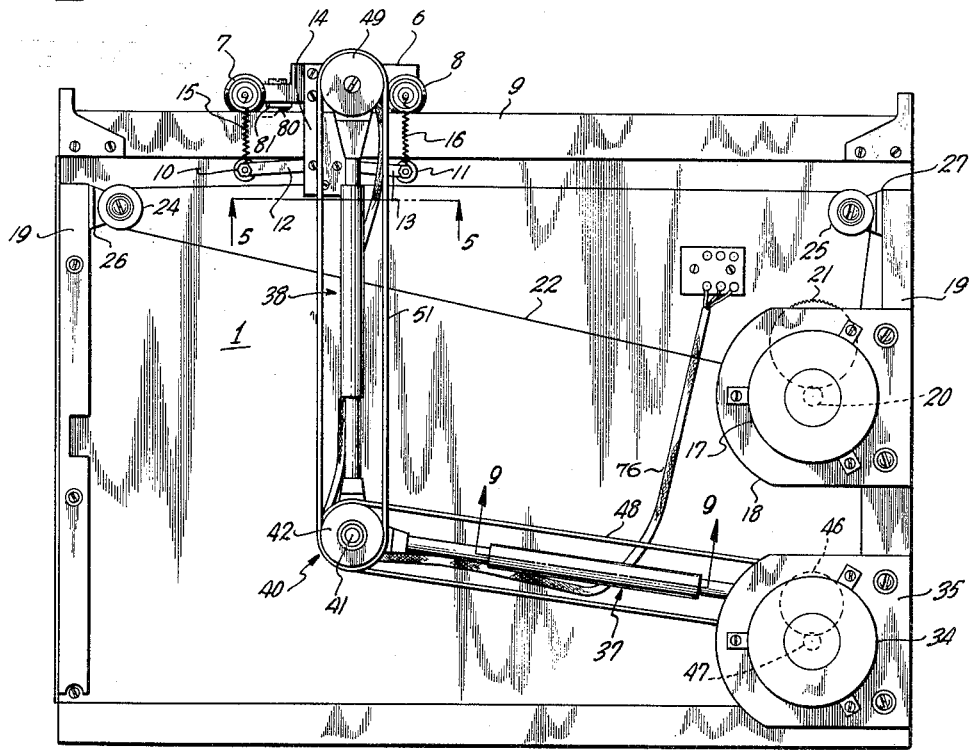
FIG. 3 is a bottom view of the graphical recorder taken along line 3—3 of FIG. 2.
Figure 2:
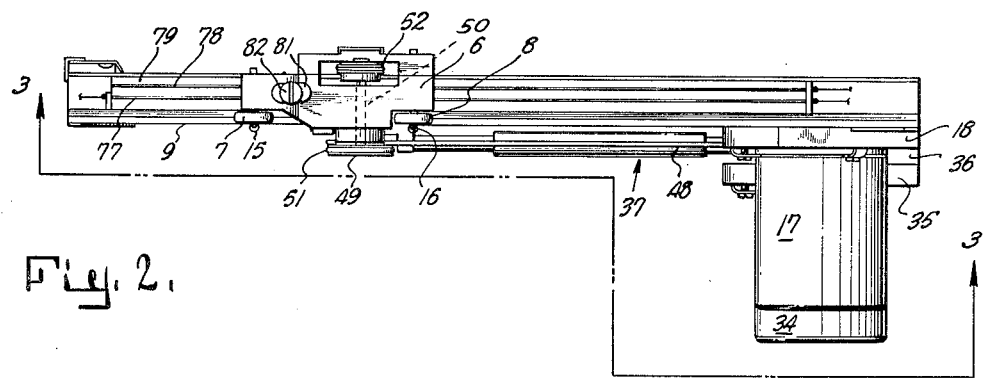
FIG. 2 is a front edge view of the graphical recorder taken along line 2—2 of FIG. 1.

The carriage 3 is driven longitudinally along the graphical recorder from an X-axis drive motor 17 (FIGS. 1, 2 and 3). The X-axis drive motor 17 is fastened to a motor block 18 which is in turn attached to a frame 19. The X-axis motor 17 drives a capstan 23 via a pair of reduction gears 20 and 21. A cable 22 is wound around the capstan 23 several times and is strung around a pair of idler pulleys 24 and 25 which are journalled in a pair of brackets 26 and 27 which are fastened to the frame 19. The cable 22 is fastened to the carriage 3 by means of a cable mounting pin 28 (FIG. 5) which is attached to the bracket 14. In operation, the drive motor 17 is energized, thereby moving the carriage 3 longitudinally of the recorder via the gear and cable drive linkage described above.

Supported by the carriage 3 (FIG. 1) is a pen plate 30 which is adapted to receive a marking element such as a pen. In the embodiment of FIG. 1 a tank 31 is connected to a pen 32 via a capillary tube 33. The pen plate 30 is transportable along the length of the carriage 3 to allow the pen 32 to be positioned in accordance with a quantity being recorded. The pen plate 30 is driven along the length of the carriage 3 by a drive motor 34 (FIGS. 1, 2 and 3), which is attached to a motor block 35. The motor block 35 is supported on the frame 19 and is separated from the frame 19 by a spacer block 36.

The linkage between the Y-axis drive motor 34 and the pen plate 30 includes a drive arm (FIG. 3) having a motor section 37 and a carriage section 38. The outer end of the motor section 37 is pivotally supported on a shaft 39 (FIG. 1) which is fastened to the motor block 35. The inner ends of the drive and carriage sections 37 and 38 of the drive arm are joined by a hinge 40 including a shaft 41. Journalled on the shaft 41 at the hinge 40 is a double section idler pulley 42. The outer end of the carriage section 38 of the drive arm is pivotally supported on the slider block 6 attached to the carriage 3.

At the outer end of the motor section 37 of the drive arm a drive pulley 45 is attached to a gear 46 which is rotatably supported on the shaft 39. A pinion 47 attached to the drive shaft of the motor 34 drives the gear 46 and the drive pulley 45. The drive pulley 45 is linked to one section of the double section idler pulley 42 by means of a belt 48.

At the outer end of the carriage section 38 (FIGS. 2, 3 and 5) of the drive arm a pulley 49 is attached to a shaft 50 which is journalled in the slider block 6. The double section idler pulley 42 is linked to the carriage pulley 49 by means of a belt 51. The belts 48 and 51 may be conventional woven type drive belts of the type which are frequently employed in dental drill pulley drive systems.

FIGS. 7, 8 and 9 illustrate in detail the construction of one suitable jointed drive arm. In FIGS. 7 and 8, the carriage section 38 of the drive arm includes an offset bracket 59 which is formed in a ring 66 to accommodate an extension from the slider block 6 (FIG. 3). Between the ring 66 and the extension from the slider block 6 is a ball bearing 65 which allows for freedom of movement between the drive arm and the slider block 6. The carriage pulley 49 is attached to the shaft 50 by a machine screw 67. At the inner end of the carriage section 38 is another offset bracket 60 which is pivoted on the shaft 41. In a similar fashion, an offset bracket 61 at the inner end of the motor section 37 of the drive arm is pivoted on the shaft 41 to form the hinge 40. At the outer end of the motor section 37, an offset bracket 62 supports the drive pulley 45 and gear 46. The double section idler pulley 42 may be rotatably supported on the shaft 41 as shown.

Between the shafts 55 and 56 of the carriage section 38 may be inserted a belt tensioning spring 57 (FIG. 9) which is enclosed within a sleeve 58 for maintaining tension on the belt 51 (FIG. 3). An identical spring and sleeve may be similarly included between the shafts 63 and 64 of the motor section 37 of the drive arm to maintain tension on the belt 48 (FIG. 3).

Attached to the shaft 50 and rotatable therewith is a sheave 52 (FIGS. 1 and 2). The sheave 52 drives a pen cable 53 which is strung around the sheave 52 and an idler pulley 54 rotatably supported at the opposite end of the carriage 3. The pen cable 53 may be fastened to the pen plate 30 through the holes in the plate as shown in FIG. 6. When the Y-axis drive motor 34 is energized, the pen plate 30 is driven along the length of the carriage 3 via the gear, belt and cable linkage described above. Accordingly, the pen 32 may be positioned from a stationary motor 34 independently of the position of the carriage 3.

The graphical recorder of FIGS. 1 through 9 is adapted to be used in combination with a pair of servo systems for energizing the drive motors 17 and 34. Two separate servo systems are required; one for energizing the drive motor 17 to position the carriage 3 along the X-axis of the recorder and another to energize the drive motor 34 to position the pen 32 along the Y-axis of the recorder. The servo systems may be of the type commonly referred to as self balancing potentiometer circuits in which an input signal is opposed to a balancing signal which is derived from the contact of a potentiometer, a standard reference voltage is applied across the resistance element of the potentiometer, and the potentiometer contactor is driven by a motor until the rebalancing voltage is substantially equal and opposite to the input signal.

In conventional graphical recorder equipment, it is well known to attach a rotary potentiometer to the shaft of a drive motor for generating a rebalancing signal. However, where the pen is driven through a mechanical linkage from the drive motor and the potentiometer is attached to the shaft of the drive motor, any errors which occur in the mechanical linkage are not corrected by the balancing action. Thus, even though the potentiometer contactor is positioned to generate a rebalancing voltage the position of the pen may not be an accurate representation of the input signal.

Referring specifically to the graphical recorder of FIGS. 1–9, an improved arrangement for generating rebalancing voltages includes a resistance wire 70 (FIG. 6) embedded in an insulating strip 71 fastened on the bottom side of the carriage 3. In addition, a conductor 72 is embedded in the insulation strip 71 parallel and adjacent to the resistance wire 70. A sliding contactor 73 may be held in an insulating block 74 on the pen plate 30. The contactor 73 electrically connects the resistance wire 70 and the conductor 72 at a position corresponding to the position of the pen 32. A standard reference voltage may be applied across the resistance wire 70 and the voltage appearing on the conductor 72 may be used as a rebalancing voltage for indicating the position of the pen 32 along the Y-axis of the recorder. In order to simplify the electrical connections to the resistance wire 70 a second conductor 75 may be embedded in the insulating strip 71 along the length of the resistance wire 70. At the top end of the carriage 3 the conductor 75 may be electrically connected to the resistance wire 70. Thus, by means of a flexible three conductor cable 76 (FIG. 3), one wire of which is connected to the resistance wire 70 and the other two of which are connected to the conductors 72 and 75, a reference voltage may be connected across the resistance wire 70 and a rebalancing voltage may be derived from the conductor 72. Since the position of the contactor 73 represents the position of the pen 32, the improved potentiometric arrangement shown generates a rebalancing voltage having a high degree of accuracy.

In a similar manner, a resistance wire 77 and a conductor 78 are embedded in an insulating strip 79 supported by the frame 9 along the X-axis of the recorder between the slider block 6 and the frame 9 (FIG. 2). A sliding contactor 80 mounted on an insulating block 81 is held in an opening in the slider block 6 by a screw 82. The contactor 80 electrically connects a point on the resistance wire 77 to the conductor 78. By impressing a standard reference voltage across the resistance wire 77, the voltage appearing on the conductor 78 represents the position of the carriage 3 along the X-axis of the recorder. Since the slider block 6 is an integral part of the carriage 3, the voltage derived from the conductor 78 accurately represents the position of the pen 32 along the X-axis of the recorder.

FIG. 10 is a block diagram illustrating one type of servo system which may be used to advantage in the graphical recorder of FIGS. 1 through 9. In FIG. 10 an X-axis input signal may be applied to the terminals 85 and 86. The input signals applied to the terminals 85 and 86 are passed to a balancing circuit 87 via an attenuator 88. The attenuator 88 is adapted to pass a fractional part of the input signal so that the input signal applied to the balancing circuit 87 may be kept within the range of the apparatus for a wide range of values of input signals. The balancing circuit 87 compares the input signal with a rebalancing signal derived from the slide contactor 80 engaging the resistance wire 77. In a state of unbalance an error signal is provided by the balancing circuit 87 which is applied to a conventional vibrator type circuit interruptor 89. An alternating current signal from the vibrator 89 is amplified by a conventional servo amplifier 90 and applied to the X-axis drive motor 17. The reversible drive motor 17 is linked to the contactor 80 engaging the resistance wire 77 by the cable 22. As the system approaches a state of balance the error signal from the balancing circuit 87 decreases until the rebalancing signal is substantially equal and opposite to the input signal. In a state of balance, the motor 17 comes to rest until such time as a change occurs in the input signal.

In like manner, a Y-axis input signal may be applied to the input terminals 92 and 93 attenuated by an attenuator 94, and applied to a balancing circuit 95 which receives a rebalancing signal derived from the sliding contactor 73 engaging the resistance wire 70. The Y-axis error signal output from the balancing circuit 95 is converted to alternating current by means of the vibrator type interruptor 96, the alternating current signal from the vibrator 96 is amplified by a Y-axis servo amplifier 97 and applied to the Y-axis drive motor 34. The Y-axis drive motor 98 is linked to the sliding contactor 73 by the belts supported by the drive arm sections 37 and 38 and the cable 53. In operation, the Y-axis servo system is similar to the X-axis servo system with the drive motor 34 being energized to move the contactor engaging the resistance element 70 to a position at which the rebalancing signal applied to the balancing circuit 95 is substantially equal and opposite to the input signal passed by the attenuator 94.

A standard cell 99 may be connected across the resistance element 77 for providing an X-axis rebalancing signal, and a standard cell 100 may be connected across the resistance wire 70 for providing a Y-axis rebalancing voltage.

When the apparatus of FIGS. 1–9 is used in conjunction with a servo system, such as that of FIG. 10, there is provided an improved graphical recorder which is capable of producing a highly accurate record of the relationship between two variables.

What is claimed is:

1. In a graphical recorder in which a marking element is transported relative to a recording medium, the combination of a first drive motor for translating said marking element in a first given direction, a second drive motor for translating said marking element in a second given direction transverse of said first given direction, a carriage bearing said marking element, means linking said first drive motor to said carriage for translating said marking element in said first given direction, a drive arm having a carriage section and a motor section, a hinge between said carriage section and said motor section, a double section idler pulley mounted adjacent said hinge, a drive pulley linked to said second drive motor, a first drive belt engaging said idler pulley and said drive pulley, a carriage pulley rotatably supported on said carriage, a second drive belt engaging said idler pulley and said carriage pulley, and means linking said carriage pulley to said marking element to translate said marking element in said second direction transverse of said first given direction.

2. Apparatus in accordance with claim 1 including a first resistance wire mounted adjacent said carriage, a first electrical contactor on said carriage engaging said first resistance wire, a second resistance wire supported by said carriage, and a second electrical contactor engaging said second resistance wire in accordance with the position of said marking element.

3. A drive mechanism for a graphical recorder, including in combination a carriage adapted to move longitudinally of the recorder in a first given direction, a marking element supported by said carriage, said marking element being adapted to be moved along said carriage in a second given direction transverse of said first given direction, means for positioning said carriage in accordance with a first variable quantity, a drive arm having two sections joined by a hinge, a double section idler pulley mounted adjacent said hinge, a first pulley rotatably supported at one end of said drive arm, a first drive belt engaging said double section idler pulley and said first pulley, a second pulley rotatably mounted on said carriage, a second drive belt engaging said double section pulley and said second pulley, means linking said marking element to said carriage pulley, and means rotating said first pulley whereby said marking element is positioned transversely in accordance with a second variable quantity.

4. A drive mechanism for a graphical recorder including in combination a carriage transportable along the recorder in a first given direction, a jointed drive arm linked between said carriage and a stationary position, an idler pulley centrally disposed on said jointed drive arm, a first pulley mounted at one end of said jointed drive arm adjacent said stationary position, a second pulley mounted on said carriage adjacent the other end of said jointed drive arm, a first drive belt strung around the idler pulley and said first pulley, a second drive belt strung around said second pulley and said idler pulley, a marking element supported on said carriage, means linking said marking element to the second pulley, and means rotating said first pulley whereby said marking element may be transported in a direction transverse of the direction in which said carriage is transportable along the recorder.

5. Apparatus in accordance with claim 4 including a first potentiometric resistance element extending along the range of travel of said carriage, a first contactor supported by said carriage and engaging said first resistance element, a second potentiometric resistance element supported by said carriage along the range of travel of said marking element, and a second contactor which engages said second potentiometric resistance element in a position corresponding to the position of said marking element.

6. A drive mechanism for graphical recorders including in combination a drive arm having two sections joined by a hinge, a double section idler pulley mounted adjacent said hinge, a first pulley rotatably supported at one end of said drive arm, a first drive belt engaging said double section idler pulley and said first pulley, a movable carriage, a rotatable shaft mounted adjacent the other end of said drive arm on one end of said carriage, a second pulley mounted on said rotatable shaft, a second drive belt engaging said double section idler pulley and said second pulley, a drive sheave mounted on said rotatable shaft, an idler sheave mounted on the opposite end of said carriage, a drive cable strung around the drive sheave and the idler sheave, a marking element fastened to the drive cable and means rotating said first pulley whereby said marking element is positioned along said carriage in accordance with a variable quantity.

7. Apparatus in accordance with claim 6 including a potentiometric resistance element mounted on said carriage along the range of travel of said marking element, and a contactor engaging the potentiometric resistance element in a position corresponding to the location of said marking element.

8. In a graphical recorder in which a marking element is transported relative to a recording medium, the combination of a carriage adapted to move longitudinally of the recorder in a first given direction, a marking element supported by said carriage, means positioning said carriage in said first given direction in accordance with a variable quantity, a drive arm having two sections joined by a hinge, a double section idler pulley mounted adjacent said hinge, a first pulley rotatably supported at one end of said drive arm, a first drive belt engaging said double section idler pulley and said first pulley, a second pulley rotatably mounted on said carriage adjacent the other end of said drive arm, a second drive belt engaging said double section idler pulley and said second pulley, means linking said marking element to said carriage pulley, and means rotating said first pulley whereby said marking element is positioned along the carriage in accordance with a second variable quantity.

9. A drive system for a graphical recorder including in combination, a carriage adapted to move longitudinally of the recorder in a first given direction, a marking element supported by said carriage, said marking element being adapted to be moved along said carriage in a second given direction transverse of said first given direction, a first servo system linked to said carriage for positioning said carriage in accordance with a first variable quantity, a drive arm having two sections joined by a hinge, a double section idler pulley mounted adjacent said hinge, a first pulley rotatably supported at one end of said drive arm, a first drive belt engaging said double section idler pulley and said first pulley, a second pulley rotatably mounted on said carriage adjacent the other end of said drive arm, a second drive belt engaging said double section idler pulley, and said second pulley, means linking said marking element to said carriage pulley, and a second servo system linked to said first pulley for positioning said marking element in said second given direction in accordance with a second variable quantity.

10. Apparatus in accordance with claim 9 in which said first servo system includes a first potentiometer for generating a rebalancing signal, said potentiometer including a first resistance element extending along the range of travel of said carriage and a first contactor engaging said resistance element at a position corresponding to the location of said marking element along the recorder in said first given direction, said second servo system including a second potentiometer for generating a rebalancing signal including a resistance element extending along the range of travel of said marking element in said second given direction and a second contactor engaging said second resistance element in a position corresponding to the location of said marking element in a second given direction.

11. A graphical recorder including the combination of a recording bed, a carriage extending transversely of the bed and movable longitudinally along the bed, a drive sheave mounted on one end of the carriage, an idler sheave mounted on the opposite end of the carriage from the drive sheave, a drive cable strung around the drive sheave and the idler sheave, a marking element attached to the drive cable for movement along the length of the carriage in a direction transverse of the movement of the carriage, a first stationary servo motor for positioning the carriage along the recorder bed, a second stationary servo motor, a jointed drive arm having a first pulley driven from the second stationary servo motor, an idler pulley mounted centrally of the jointed drive arm, a second pulley supported by the carriage and linked to the drive sheave for rotational movement therewith, a first drive belt linking the first pulley to the idler pulley and a second drive belt linking the idler pulley to the second pulley whereby the marking element may be positioned along the length of the carriage from the second stationary servo motor via the first pulley, the first drive belt, the idler pulley, the second drive belt, the second pulley, the drive sheave and the drive cable.

12. A graphical recorder including the combination of a recording bed, a carriage extending transversely of the bed and movable longitudinally along the top of the bed, a drive sheave mounted on one end of the carriage, an idler sheave mounted on the opposite end of the carriage from the drive sheave, a drive cable strung around the drive sheave and the idler sheave, a marking element attached to the drive cable for movement along the length of the carriage in a direction transverse of the movement of the carriage, a first stationary servo motor mounted beneath the bed for positioning the carriage along the recorder bed, a second stationary servo motor mounted beneath the bed, a jointed drive arm disposed beneath the bed having a first pulley driven from the second stationary servo motor, an idler pulley mounted centrally of the jointed drive arm, a second pulley supported for movement with the carriage, a shaft linking the second pulley to the drive sheave for rotational movement, a first drive belt linking the first pulley to the idler pulley and a second drive belt linking the idler pulley to the second pulley whereby the marking element may be positioned along the length of the carriage on top of the bed from the second stationary servo motor beneath the bed via the first pulley, the first drive belt, the idler pulley, the second drive belt, the second pulley, the shaft, the drive sheave and the drive cable.

13. Apparatus in accordance with claim 12 including a first potentiometric resistance element extending along the length of travel of said carriage, a first contactor supported by said carriage and engaging said first resistance element, a second potentiometric resistance element supported by said carriage along the range of travel of said marking element, a second contactor engaging said second potentiometric resistance element in a position corresponding to the position of said marking element, a first servo system connected between the first resistance element and the first servo motor for positioning the carriage in accordance with an input signal, and a second servo system connected between the second resistance element and the second servo motor for positioning the marking element along the carriage in accordance with an input signal.

References Cited in the file of this patent
UNITED STATES PATENTS

| | | |
|---|---|---|
| 179,375 | Warth | June 27, 1876 |
| 489,117 | Berry | Jan. 3, 1893 |
| 1,139,808 | Ryckman | May 18, 1915 |
| 1,386,555 | Hughes et al. | Oct. 9, 1945 |
| 2,655,426 | Barnes | Oct. 13, 1953 |
| 2,727,308 | Kuhn et al. | Dec. 20, 1955 |
| 2,874,019 | Linsley et al. | Feb. 17, 1959 |